(12) United States Patent
Zagar et al.

(10) Patent No.: US 7,525,611 B2
(45) Date of Patent: Apr. 28, 2009

(54) NIGHT VISION COMPATIBLE DISPLAY BACKLIGHT

(75) Inventors: Peter A. Zagar, Hartford, WI (US); Thaddeus Raymond Ulijasz, Brookfield, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 69 days.

(21) Appl. No.: 11/338,314

(22) Filed: Jan. 24, 2006

(65) Prior Publication Data

US 2007/0171623 A1    Jul. 26, 2007

(51) Int. Cl.
   *G02F 1/1335*    (2006.01)
(52) U.S. Cl. .................... 349/68; 349/61; 362/231
(58) Field of Classification Search ............ 362/26, 362/29, 30, 230, 251, 561, 800, 555; 349/64, 349/68; 348/64, 68
   See application file for complete search history.

(56) References Cited

U.S. PATENT DOCUMENTS

| 5,107,184 | A | 4/1992 | Hu et al. |
| 5,406,305 | A | 4/1995 | Shimomura et al. |
| 5,661,578 | A * | 8/1997 | Habing et al. .................. 349/65 |
| 5,933,089 | A | 8/1999 | Katada |
| 6,144,359 | A | 11/2000 | Grave |
| 6,281,640 | B1 | 8/2001 | Kim |
| 6,388,388 | B1 | 5/2002 | Weindorf et al. |
| 6,452,582 | B1 | 9/2002 | Rolston |
| 6,786,617 | B2 * | 9/2004 | Lemay et al. ................. 362/230 |
| 6,789,921 | B1 * | 9/2004 | Deloy et al. ................. 362/252 |
| 6,817,735 | B2 | 11/2004 | Shimizu |
| 6,841,947 | B2 | 1/2005 | Berg-johansen |
| 6,842,204 | B1 * | 1/2005 | Johnson ........................ 349/74 |
| 7,036,946 | B1 * | 5/2006 | Mosier ......................... 362/27 |
| 7,040,794 | B2 * | 5/2006 | Bernard ........................ 362/555 |
| 7,083,302 | B2 * | 8/2006 | Chen et al. .................... 362/231 |
| 7,126,567 | B2 * | 10/2006 | Nishikawa .................... 345/77 |
| 7,197,338 | B2 * | 3/2007 | Ozawa ......................... 455/566 |
| 2001/0035848 | A1 | 11/2001 | Johnson et al. |
| 2001/0035853 | A1 * | 11/2001 | Hoelen et al. ................ 345/102 |
| 2002/0130786 | A1 | 9/2002 | Weindorf |
| 2003/0169226 | A1 | 9/2003 | Yamada |
| 2003/0174586 | A1 * | 9/2003 | Hon et al. ..................... 368/84 |
| 2003/0214242 | A1 | 11/2003 | Berg-johansen |
| 2004/0056989 | A1 * | 3/2004 | Betz et al. ..................... 349/68 |
| 2004/0109244 | A1 | 6/2004 | Kokogawa |
| 2005/0093792 | A1 | 5/2005 | Yamamoto et al. |
| 2005/0116921 | A1 | 6/2005 | Kim |
| 2005/0243570 | A1 * | 11/2005 | Chaves et al. ................ 362/551 |
| 2006/0232995 | A1 * | 10/2006 | Wu et al. ..................... 362/613 |

OTHER PUBLICATIONS

Author: Richard Borkowski, "Modifying Your Cockpit Lighting for Night Vision," in the Journal of the Airborne Law Enforcement Association, Mar.-Apr. 2005.

* cited by examiner

*Primary Examiner*—Sandra L. O'Shea
*Assistant Examiner*—Gunyoung T. Lee
(74) *Attorney, Agent, or Firm*—Boyle Fredrickson, S.C.

(57) ABSTRACT

A system and method of backlighting a display using LEDs is night vision viewing compatible and requires no filters. The backlight includes an array of LEDs and a controller configured to selectively illuminate the LEDs in the array. The array of LEDs includes orange LEDs that are illuminated during a night vision viewing mode and may include red LEDs that are illuminated in a non-night vision viewing mode.

17 Claims, 6 Drawing Sheets

NIGHT VISION COMPATIBLE DISPLAY BACKLIGHT

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to a backlight for a display and, in particular, to a light emitting diode ("LED") backlight for a display that is compatible with night vision systems.

Graphic displays, such as those employing a liquid crystal display ("LCD") screen provide a field of pixel elements, each of which may be independently controlled to block or pass light, for example, from an underlying backlight.

A common backlight for use with an LCD screen provides a transparent panel edge lit by one or more fluorescent tubes. A reflective rear surface of the panel directs the edge illumination towards an LCD screen positioned against a front surface of the panel. The reflective rear surface of the panel may be gradated to produce an even field of illumination behind the LCD screen to compensate for an inherent falloff of brightness attributable to a distance of the fluorescent tube. In this regard, fluorescent tubes provide a relatively high efficiency light source providing a broad color spectrum output suitable for backlighting LCD screens.

However, in some applications, fluorescent tube backlights have a number of disadvantages. For example, fluorescent tube backlights generally require a high voltage power supply, include fragile glass tubes, have a tendency to fail unexpectedly, and have a limited ability to change brightness levels. In avionics and other demanding applications, where these drawbacks are substantial, LED backlights may be preferred.

In avionics, night vision systems ("NVS") or night vision imaging systems ("NVIS") are sometimes employed. These NVSs work by collecting photons and passing the photons through an image intensifier assembly to create an image that is visible to a user in a micro-display worn by the user. A given NVS may amplify the nighttime scene approximately 2000 times. Accordingly, NVSs must be used in an environment that is substantially free of stray cockpit light in the NVIS band. In particular, NVSs have a very high sensitivity to radiation in the region of approximately 620 nanometers (nm) to 930 nm (orange to infrared), thus stray infrared ("IR") illumination must be controlled or else a "bloom" will be experienced where the image intensifier assembly is overloaded and the image shown on the micro-display becomes unviewable.

In some cases, NVSs may be equipped with an automatic gain control ("AGC") that will decrease the sensitivity of the NVS when exposed to high radiation in the region of approximately 620 nm to 930 nm to protect the image intensifier assembly and the user from experiencing a bloom. In this regard, if, for example, displays or light sources in an airplane cockpit emit high radiation in these regions, the AGC may activate and the NVS will become proportionally less sensitive to nighttime objects outside of the cockpit.

In order to protect against blooms and/or decreased sensitivity caused by AGC functions, night vision compatibility standards, such as NVIS standards, have been developed to guide the design of lighting equipment that can be used with and without NVSs. Under avionics NVIS standards, overlap between the emissions spectrum of the display or backlight and the spectral response of the NVS is minimized. There are also NVIS standards for ground vehicle operations where lower or near infrared transmittance need not be eliminated, but should be significantly reduced to, for example, 5 percent of the total visible component.

To meet such standards, filters are commonly used, which reflect or absorb radiation that could interfere with the operation of NVS while allowing visible light to pass. For example, a "hot mirror", positioned between the backlight and LCD screen, which rejects the undesired infrared rays, but lets visible light pass through, is also often used to filter displays for use with NVSs. By significantly reducing IR radiation in electronic display and lighting systems, NVSs can be used along with such electronic display and lighting systems without affecting the nighttime sensitivity of the NVSs.

Unfortunately, these filters add significantly to the cost of the LCD screens. Furthermore, these filters are generally permanently affixed to the LCD screen decreasing the intensity of a display by approximately 10 to 20 percent, which corresponds to a significantly dimmed screen when viewed in conditions such as daylight. Furthermore, these filters often impede portions of the visible spectrum range and/or viewing angle in which case, the LCD screen may appear "unnatural" to an operator especially when viewed in daylight. The effectiveness of an interference type filter varies at different viewing angles, causing further loss of visible light.

To overcome these shortcomings, the power delivered to drive the display is often increased. While this may compensate for the decreased intensity, the additional heat generated by the increased power consumption places strain on cooling systems. Furthermore, the additional power consumption may be undesirable in many applications such as avionics when a fixed supply of power is available.

It would therefore be desirable to have a cost-efficient LED backlight for a display that is compliant with night vision viewing standards and is capable of performing sufficiently during periods when night vision systems are not employed.

BRIEF SUMMARY OF THE INVENTION

The present invention provides a system and method of backlighting a display using LEDs that does not require filters and meets NVIS standards.

In particular, provides a backlight for an LCD screen having an array of LEDs and a controller configured to selectively illuminate the LEDs in the array, such that a first set of LEDs that generate an illumination compatible with NVIS standards are activated during a first operating mode and a second set of LEDs that generate an illumination desirable for non-NVS viewing are activated during a second operating mode. In particular, orange LEDs are illuminated during a night vision mode and red LEDs are illuminated in a non-night vision mode.

In accordance with one aspect of the invention, a system is disclosed that includes an array of LEDs configured to backlight a display and including at least an orange LED, a green LED, and a blue LED. The system also includes a controller configured to selectively illuminate at least one of the LEDs in the array of LEDs.

In accordance with another aspect of the invention, a backlighting system for a display is disclosed that includes a plurality of LEDs grouped into sets of LEDs. A controller is configured to switch each set of LEDs between a first operating mode having a first group of LEDs activated to backlight the display, and a second operating mode having a second group of LEDs activated to backlight the display. For example, based on the operating mode, the controller may selectively illuminate red and/or orange LEDs while blue and green LEDs remain illuminated over both modes.

In accordance with yet another aspect of the invention, a method of backlighting an LCD display is disclosed that includes activating a plurality of LEDs including red LEDs during a first operating condition and activating a plurality of LEDs including orange LEDs during a second operating condition. In this regard, an intensity of light emitted during the second operating condition complies with a night vision standard for viewing the LCD display.

Various other features of the present invention will be made apparent from the following detailed description and the drawings.

DETAILED DESCRIPTION OF THE PREFERRED EMBODIMENT

Figure 1:
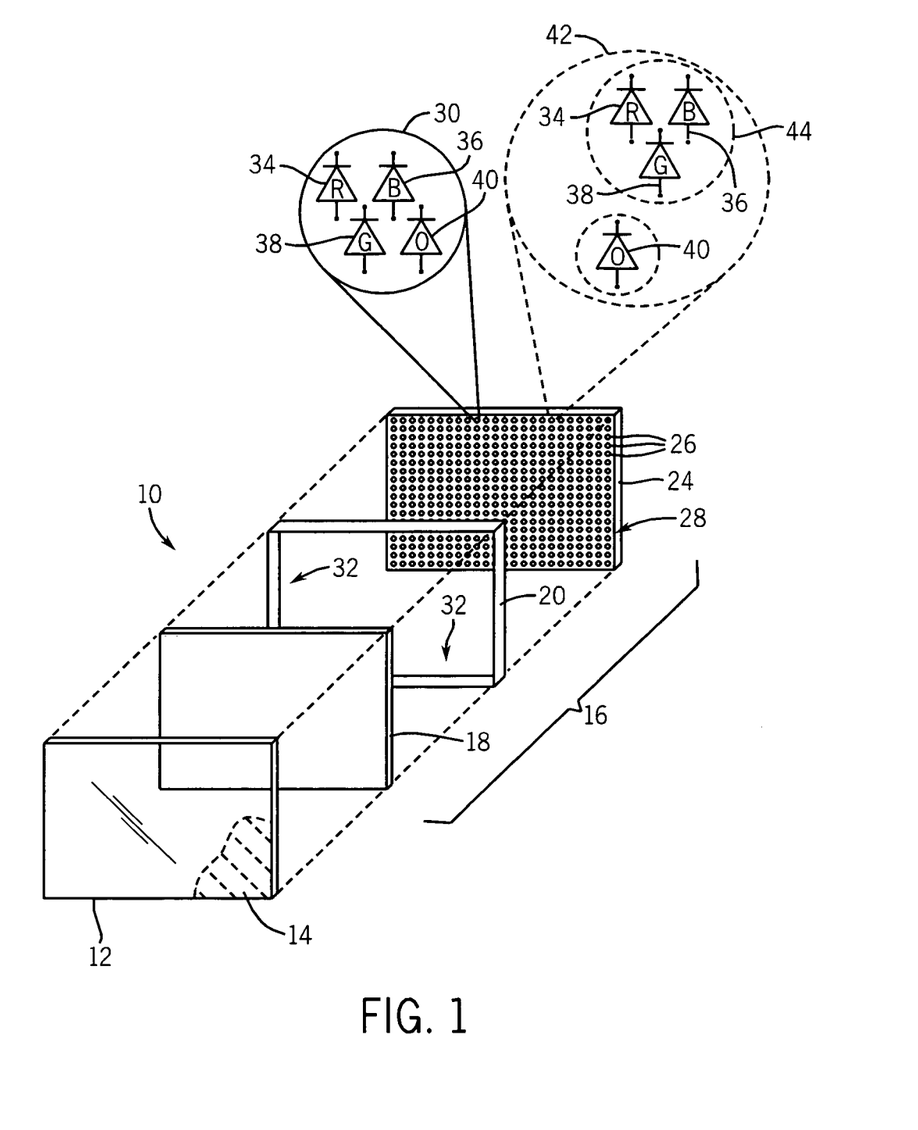
FIG. 1 is a perspective, exploded view of a display system incorporating a backlight system according to the present invention.

Referring now to FIG. 1, a display system 10, for example an avionics display system, includes a liquid crystal display ("LCD") 12 designed to produce graphic representations of, for example, avionics indicator gauges. As will be described, the LCD 12 may include an optional filter 14. The filter 14 may provide electromagnetic interference ("EMI") shielding, radio frequency interference ("RFI") shielding, antiglare/antireflective functionality, and/or contrast enhancement. Additionally, as will be described, the filter 14 may filter radiation in a lower NVIS band and/or upper NVIS band.

Arranged rearwardly of the LCD 12 is a backlight assembly 16 including a diffuser 18, a mixing assembly 20, and a matrix or array of light-emitting diodes ("LEDs") 24. The diffuser 18 is positioned between the LED array 24 and the LCD screen 12, and serves to spread light from many point source LEDs in the LED array 24. The diffuser 18, may, for example, also include a lens or holographic screen that collimates or directs the light toward a preferential viewing angle.

The mixing assembly 20 includes upstanding mirrored side walls 32 that are arranged around the LED array 24 to provide an enclosure open toward the diffuser 18 that serves to spread light from the array of LEDs 24 and provide a more even field of illumination to uniformly light the LCD screen 12.

The LED array 24 is formed of a plurality of multi-LED groups 26 arranged, for example, on a regular grid over a mirrored planar surface 28 commensurate with the area of the LCD screen 12. It is contemplated that the multi-LED groups 26 may be clustered or grouped into a set 30 that, as will be described, include a red LED 34, a green LED 36, a blue LED 38, and an orange LED 40. Alternatively, a set 42 of LEDs may be formed from a subset 44 including the red LED 34, the green LED 36, and the blue LED 38, as is readily commercially available, and the orange LED 40 clustered therewith. It is also contemplated that the LEDs 26 may be grouped in a variety of alternative configurations such as by color in specific areas across the mirrored planar surface 28.

As will be described with respect to FIGS. 4 and 5, it is contemplated that the green LED 36, blue LED 38, and orange LED 40 are LEDs having low spectral emissions in the lower NVIS band and the Upper NVIS band. In this regard, it is contemplated that traditional (i.e. non-thin film) green and blue LEDs may be utilized as they have spectral profiles suitable to night vision viewing while the orange LEDs are, preferably, thin-film LEDs. Moreover, the red LED 34 may also be a thin-film LED. However, green and blue LEDs having manufacturing properties similar to thin-film orange and red LEDs may also be used. In this regard, such green and blue LEDs are often referred to as thin GaN LEDs.

Figure 2:
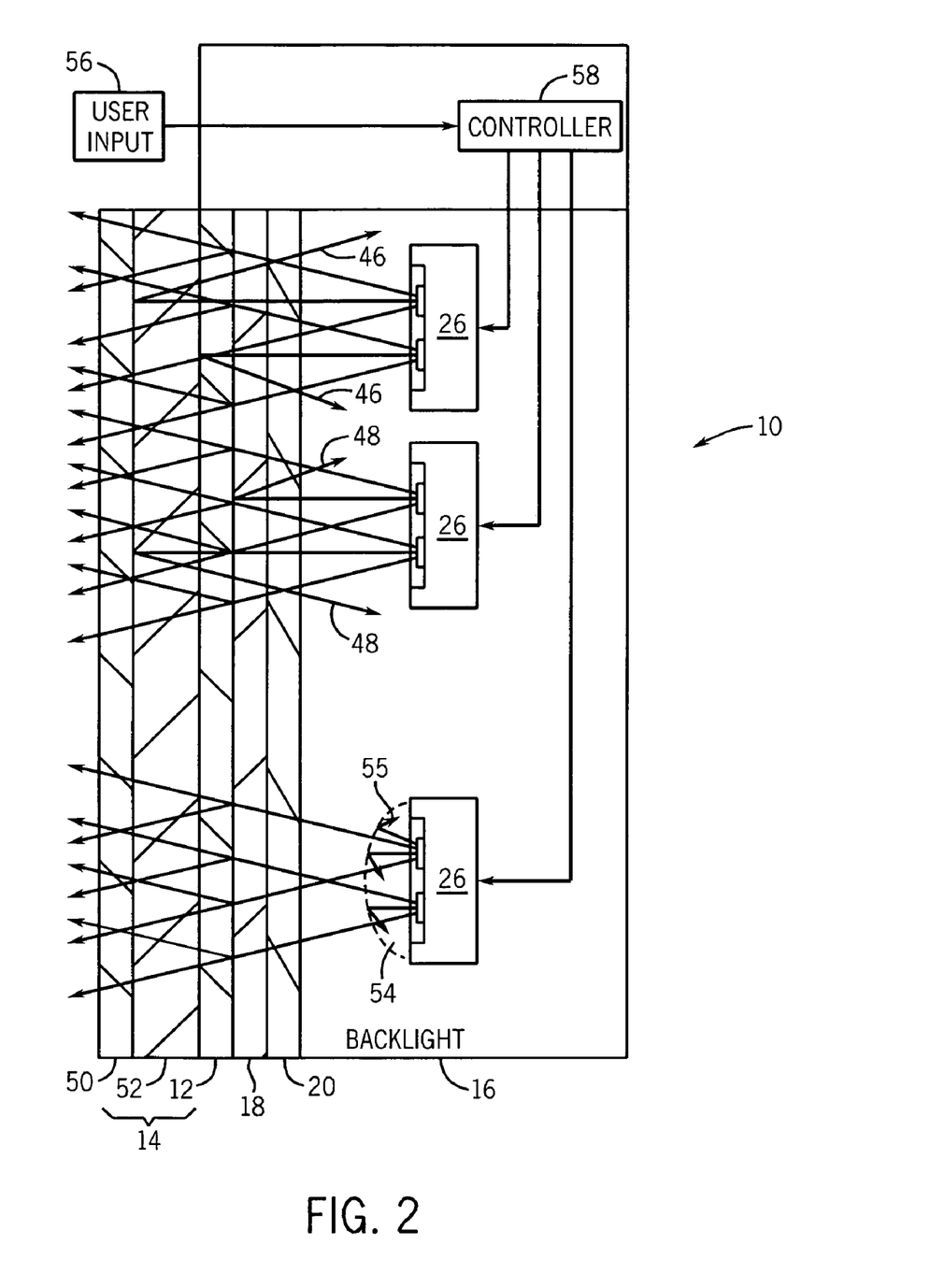
FIG. 2 is plan/schematic view of the display and backlight system of FIG. 1.

Referring now to FIG. 2, the display system 10 of FIG. 1 is in cross section. In operation, when the multi-LED groups 26 are illuminated, the backlight 16 lights the LCD display 12. Should an optional filter 14 be included on the LCD display 12, photons in particular wavelength ranges are impeded from passing from the display system 10 to aid in reducing radiation in wavelengths that are not conducive to night vision systems. It should be noted, while FIG. 2 shows the filter 14 arranged away from the backlight 16 on an outside of the LCD display 12, it is contemplated that each filter may be disposed on an interior of the LCD display 12 in closer proximity to the backlight 16.

Again, it is contemplated that the optional filter 14 may include multiple layers of filters 50, 52 configured to perform various targeted filtering and/or enhancement functions. For example, the first layer 50 may be an anti-glare layer whereas the second layer 52 may act as a collimator that directs light preferentially in a given direction. Such a configuration may be desirable when, as will be described, orange thin-film LEDs are included in the multi-LED groups 26.

However, if traditional, non-thin-film orange LEDs are included in the multi-LED groups 26, one of the layers 50, 52 may be an IR filter. Specifically, as will be described with respect to FIGS. 4 and 5, if non-thin-film orange LEDs are included in the multi-LED groups 26, at least one of the layers 50, 52 may be a far infrared filter. Additionally or alternatively, it is contemplated that a filter 54 may be disposed directly over the multi-LED groups 26 or directly over individual LEDs, such as an orange or red LED, to perform filtering or enhancement functions.

In this regard, the filter 54 may be formed in a hemispherical shape that serves to improve filtering of incident radiation in, as will be described, the lower NVIS band and the upper NVIS band. That is, traditional filters that may be arranged along a planar surface beyond the backlight generally provide significant filtering of undesirable radiation 46, 48 that is incident perpendicular to the planar the filter surface. However, as the angle of incidence deviates significantly from perpendicular, the effectiveness of the filters 50, 52 is reduced. In this regard, the hemispherically shaped filter 54 is more effective at reducing radiation 55 that is incident upon the filter 54 at varying angles.

A user input 56, such as a dial or button, is included that communicates with the controller 58 to control the illumination of the multi-LED groups 26 according to user desired parameters. In particular, the controller 58 controls the illumination of the LED backlight by adjusting the intensity of illumination of each individual LED in the multi-LED groups 26 or, alternatively, by activating or deactivating particular LEDs in the array. As will be described, when illumination desirable for viewing the display system 10 with night vision systems is selected using the user input 56, the controller activates or intensifies orange, green, and blue LEDs and deactivates or attenuates red LEDs. It this regard, the green and blue LEDs remain activated in both modes. However, in some applications it is contemplated that the intensity of the green and/or blue LEDs may be adjusted when adjusting modes. Furthermore, when illumination desirable for viewing the display system 10 without night vision systems is selected using the user input 56, the controller activates or intensifies red, green, and blue LEDs and may deactivate or attenuate the orange LEDs. It should be recognized that these color combinations may be notified to include additional colored LEDs that may be desirable in some applications.

Figure 3:
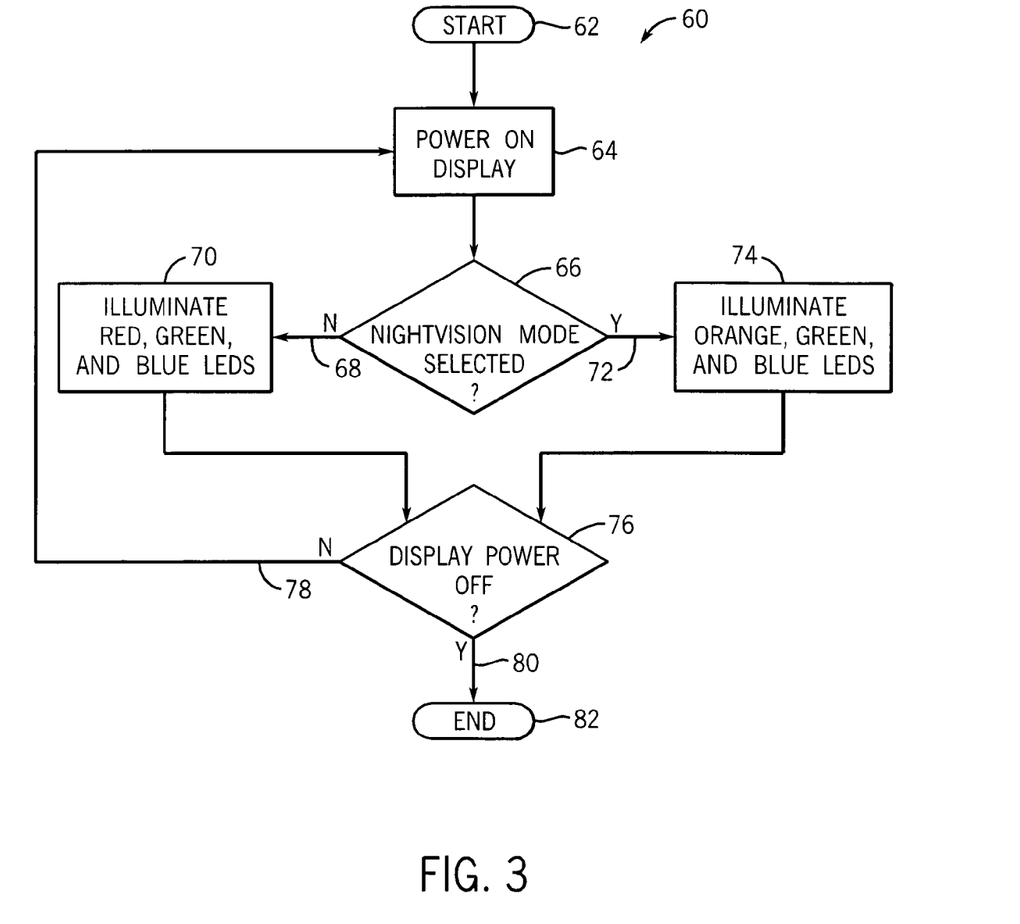
FIG. 3 is a flowchart showing the steps of a process for operating the backlight system of FIGS. 1 and 2.

Referring to FIG. 3, the processor 58 of FIG. 2, follows a control scheme 60 that starts 62 upon powering the display 64. Once the display is powered 64, the controller checks to determine whether night vision mode has been selected 66 using the user input 56 of FIG. 2. It is contemplated that such selection of night vision mode may be made by an operator simply depressing a button or switch that toggles between a night vision mode or a non-night vision mode. Alternatively, it is contemplated that the user input 56 of FIG. 2 may have an incrementally or even continuous range of inputs. In this regard, the illumination of specific LEDs within each multi-LED group 26 of FIG. 2 may be adjusted across the range of the user input 56 of FIG. 2 whereby upon reaching a predetermined position within the range of the user input, night vision mode is automatically selected.

In any case, referring again to FIG. 3, if night vision mode is not selected 68, at least the red, green, and blue LEDs are illuminated 70. That is, while additional LEDs, for example, orange LEDs, may be illuminated if night vision mode is not selected 68, at least the red, green, and blue LEDs are illuminated or activated. In this case the orange LEDs may be used to provide a more continuous white spectrum, for example. However, it is also contemplated that the intensity of illumination of given LEDs may be varied as desirable.

On the other hand, if night vision mode is selected 72, the red LED is deactivated (or at least attenuated) in favor of illuminating the orange, green, and blue LEDs 74. The process continues by determining whether the power to the display has been turned off 76 and, if not 78, loops back to continuously check whether night vision mode has been selected 66. Therefore, once power to the display has been turned off 80, the process ends 82. Accordingly, as will be explained with respect to FIGS. 4 and 5, a system and method of backlighting a display using LEDs is achieved that does not require filters and meets night vision viewing standards.

A method and apparatus for controlling the dimming of LEDs over a wide range of illumination with a desired color balance is described in co-pending U.S. application Ser. No. 11/338,315 assigned to the same assignee as the present invention and hereby incorporated by reference.

Figure 4:
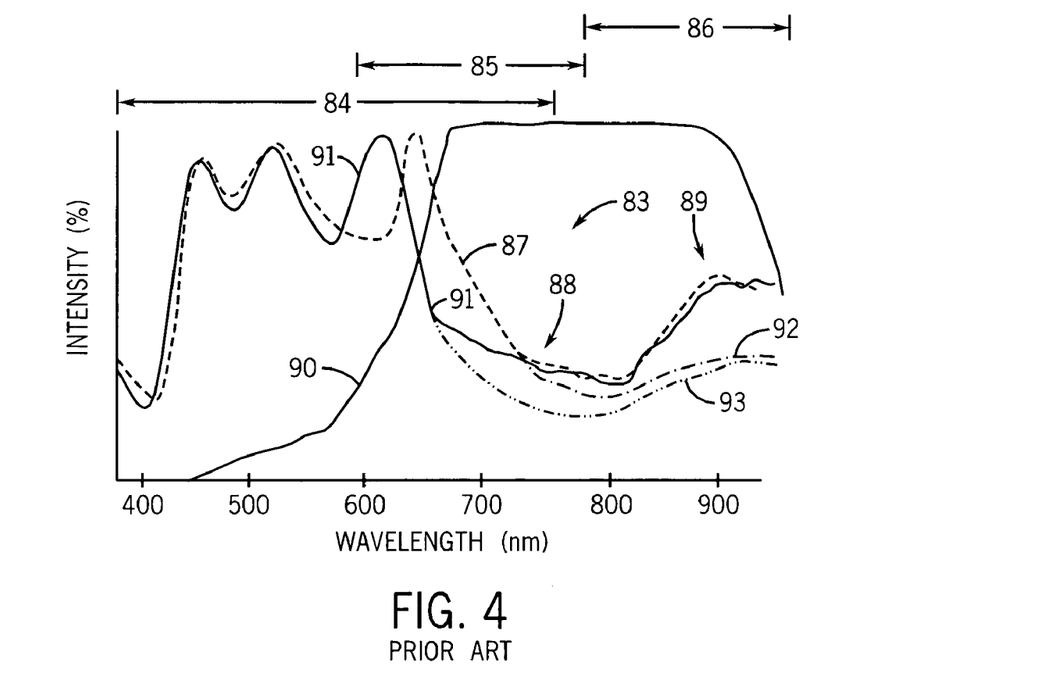
FIG. 4 is a graph illustrating a spectral distribution generated by a display system employing a prior art backlight system.

Referring to FIG. 4, spectral profiles 83 of light output as a function of wavelength are shown that extend from a visible light range 84 (approximately 380 nm to approximately 750 nm), across a lower NVIS band 85 (approximately 600 nm to 780 nm), and through an upper NVIS band 86 (greater than approximately 780 nm). The prior art spectral profiles 83 of prior art backlighting systems are undesirable for use with night vision systems as they include significant intensities at wavelengths in the lower NVIS band 85 and the upper NVIS band 86, which make them unacceptable for night vision viewing.

In particular, a first spectral profile 87 is created by illuminating traditional red, blue, and green LEDs. In this regard, the spectral profile 87 includes significant intensities 88 at wavelengths in the lower NVIS band 85 as well as significant intensities 89 at wavelengths in the upper NVIS band 86 that make the spectral profile 87 inappropriate for night vision viewing.

In particular, to determine whether spectral profile 87 is appropriate for night vision viewing, an NVIS standard curve 90, for example, an NVIS Class B Standard Curve, is used. The intensity at each wavelength under the NVIS standard curve 90 is multiplied by the corresponding wavelength intensity value of the NVIS standard curve 90 and the products are then summed. If the sum of the products are above a predetermined threshold, the spectral profile does not comply with NVIS standards. Accordingly, in order to comply with NVIS standards, it is important to limit intensities at wavelengths in the lower NVIS band 85 and the upper NVIS band 86.

For example, one NVIS standard, MIL-STD-3009 (formerly MIL-L-85762), specifies the interface and performance requirements for aircraft lighting and display equipment that is intended to be used along with night vision systems. In this regard, the sum of the intensity products across all wavelengths under the NVIS curve must be less than $2.2*10^{-9}$ watts per steradian meter$^2$ (W/sr m$^2$). When compared to this standard, the spectral profile 87 generated by illuminating traditional red, blue, and green LEDs is far in excess of acceptable tolerances. Furthermore, even when a spectral profile 91 is generated by a combination of traditional orange, blue, and green LEDs, the spectral profile 91 is excess of the MIL-STD-3009 specification and, thus, under this standard, could not be used in a avionics device when employing night vision.

Accordingly, prior art systems have relied upon filters to attenuate the spectral profiles 87, 91 in the lower NVIS band 85 and the upper NVIS band 86. In this regard, when such filtering devices are utilized, the spectral profiles 87, 91 are sufficiently attenuated, as illustrated by the respective intensity drops 92, 93, within the lower NVIS band 85 and the upper NVIS band 86 so as to be usable with night vision systems.

While these filters utilized in prior art systems do yield a backlight that conforms to night vision standards, as previously addressed, they reduce the overall intensity of the backlight by, for example, approximately 10 percent. Additionally, these prior art systems relying upon expensive filters increases power consumption of the backlight in order to yield an appropriate illumination. As such, the heat generated by the backlight is proportionately increased. Furthermore, the filters required in these prior art systems often significantly decreases the viewing angle at which the LCD display may be adequately viewed while still providing a white balanced RGB output.

Figure 5:
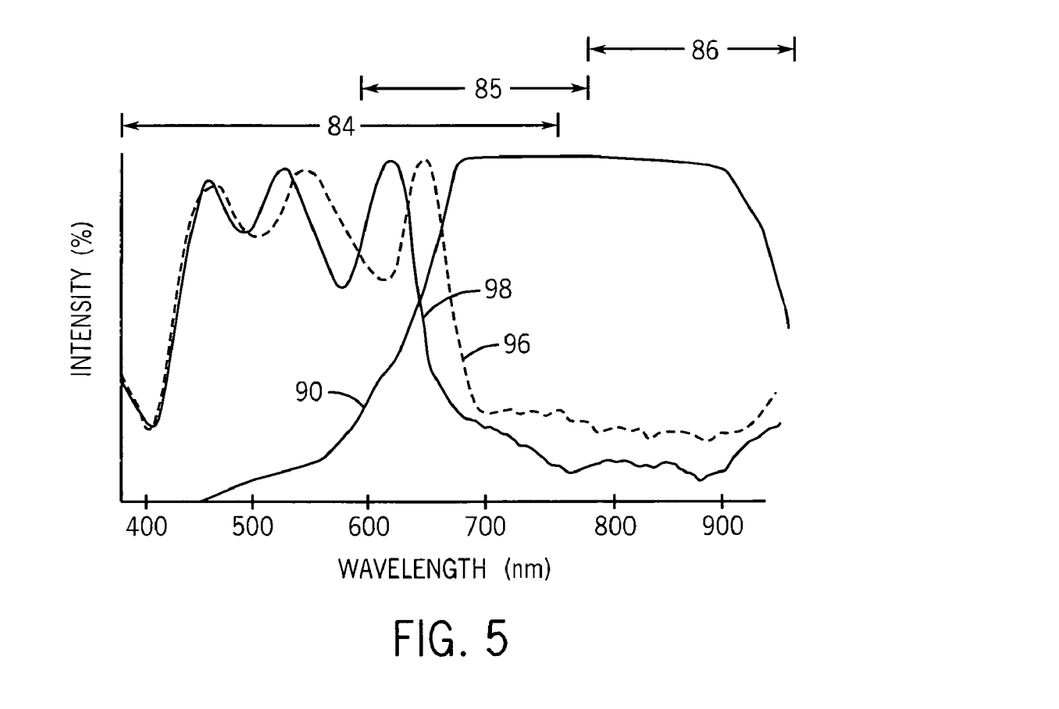
FIG. 5 is a graph illustrating a spectral distribution generated by a display system employing the backlight system of FIGS. 1 and 2.

Referring to FIG. 5, in the present invention, though filters may be optionally included, the filters are no longer necessary to be compliant with night vision viewing standards. In a first embodiment, the spectral profile of the backlight system can be shifted from a first spectral profile 96 that may include wavelength intensities in ranges above those desirable for night vision viewing, for example, for use during daytime viewing. In this regard, a second spectral profile 98 is created that is shifted with respect to the first spectral profile 96 when the red LEDs are deactivated (or attenuated) in favor of orange LEDs and, in particular, thin film orange LEDs. When the intensities of the second spectral profile 98 at wavelengths under the NVIS curve 90 are multiplied by the corresponding NVIS curve intensities and summed, the result is well within NVIS standards, such as the MIL-STD-3009. Therefore, an LED backlight is created that does not require filters and meets NVIS standards. In particular, the second spectral profile 96 in FIG. 5, meets NVIS Type 2, Class B standards and may be adjusted to meet a wide variety of night vision viewing standards.

In this regard, suitable thin-film orange or red LEDs and thin GaN green or blue LEDs are commercially available from Orsram Limited Company of Munich, Germany that provide the desired spectral output without peaks or increases within the lower NVIS band 85 or upper NVIS band 86, as shown in the prior art spectral profiles illustrated in FIG. 4 and associated with non-thin film LEDs. Alternatively, standard orange LEDs may be used and a simple IR filter (embodied as filter 14/54 of FIG. 2) may be placed over the orange LEDs only, the individual LED clusters (FIG. 2), or the entire backlight 16 (FIGS. 1 and 2). Because the spectral profiles 96, 98 are substantially free of significant intensities within the lower NVIS band 85 or upper NVIS band 86 complex and expensive interference filters with sharp cut-offs are not required.

Orange LEDs, as used herein, refers to LEDs having significant frequency intensities substantially surrounding a wavelength of approximately 620 nm. Orange light with a wavelength range of approximately 590 nm to 650 nm is distinct from red light generated by red LEDs having frequencies in the range greater than 650 nm and, more particularly, having significant frequency intensities surrounding a wavelength of approximately 680 nm.

Alternatively, if non-thin-film orange LEDs are selected, an IR filter may be utilized to target intensities in the lower and upper NVIS bands 58, 86 created by non-thin-film LEDs. In this regard, an IR filter may be positioned over the backlight or over only the orange LEDs, as shown in FIG. 2.

Therefore, a backlight system for an LCD display is created that uses orange, green, and blue LEDs to form the illumination source of the backlight. A backlight may also include red LEDs and a controller configured to switch between two modes of operation. A first mode of operation may be designed to illuminate the LCD screen during night vision viewing whereby the orange, green, and blue LEDs are illuminated. The second operational mode may be designed for non-night vision viewing and includes activating or illuminating red LEDs. The illumination of the red LED may be in conjunction with deactivation of the orange LED or both may operate concurrently. It is contemplated that the LEDs may be a thin-film type LED. Accordingly, though optional, filters or viewing enhancers or viewing angle enhancers may be included. Additionally, it is contemplated that spectral components included in the backlight may be varied by adjusting the respective illumination of each LED in the backlight system. Accordingly, by varying the ratios of the spectral components, the illumination of the LCD screen may be closely controlled. It is contemplated that the above-described system and method may be advantageously used in aviation cockpit illumination or other systems commonly employed with night vision viewing.

Figure 6:
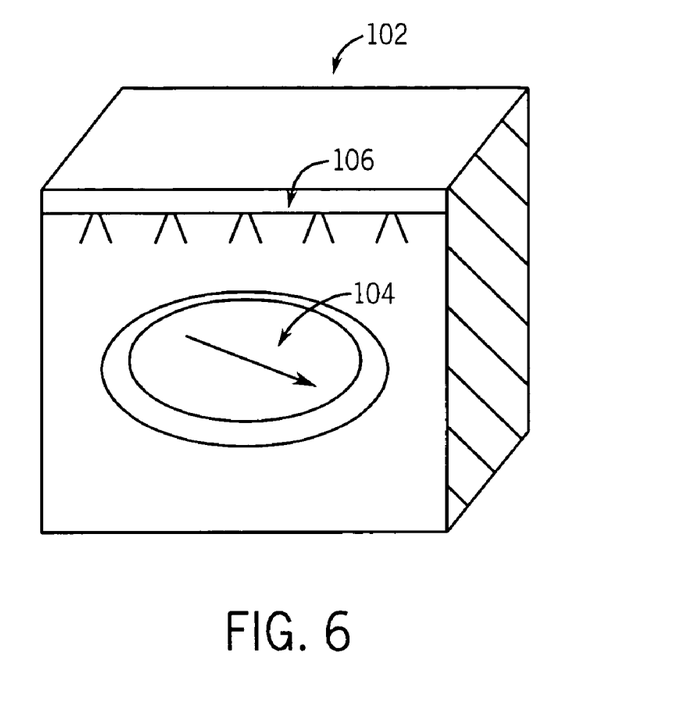
FIG. 6 is a perspective view of a reflective indicator system configured to be illuminated with a lighting system of the present invention.

Additionally, beyond backlight systems, the present invention can be utilized in a variety of additional lighting systems to create a lighting system that is usable with night vision viewing systems. For example, referring to FIG. 6, an instrument panel 102 includes one or more reflective indicators 104 configured to be illuminated with an LED lighting system 106 in accordance with the present invention. In a manner similar to the backlighting system described above, it is contemplated that the LED lighting system 106 can be operated according to at least two operational modes. For example, in a first operational mode, the LED lighting system 106 reflectively illuminates the instrument panel 102 and/or indicator 104 using red, green and blue LEDs. In this regard, the LED lighting system 106 can be switched to a second mode suitable for night vision viewing, whereby the LED lighting system 106 illuminates the instrument panel 102 and/or indicator 104 using orange, green and blue LEDs. Accordingly, as described above, thin-film LEDs, filters, or a combination thereof may be utilized to make the LED lighting system 106 and the reflective illumination of the instrument panel 102 and/or indicator 104 NVIS standards compliant. Furthermore, it is contemplated that the operating mode of the LED lighting system 106 may be operated in tandem with the above-described LCD backlight. For example, the operating mode of the LED lighting system 106 may be controlled using a common user input such that the operating mode of the above-described LCD backlight and the LED lighting system 106 is simultaneously switched.

Figure 7:
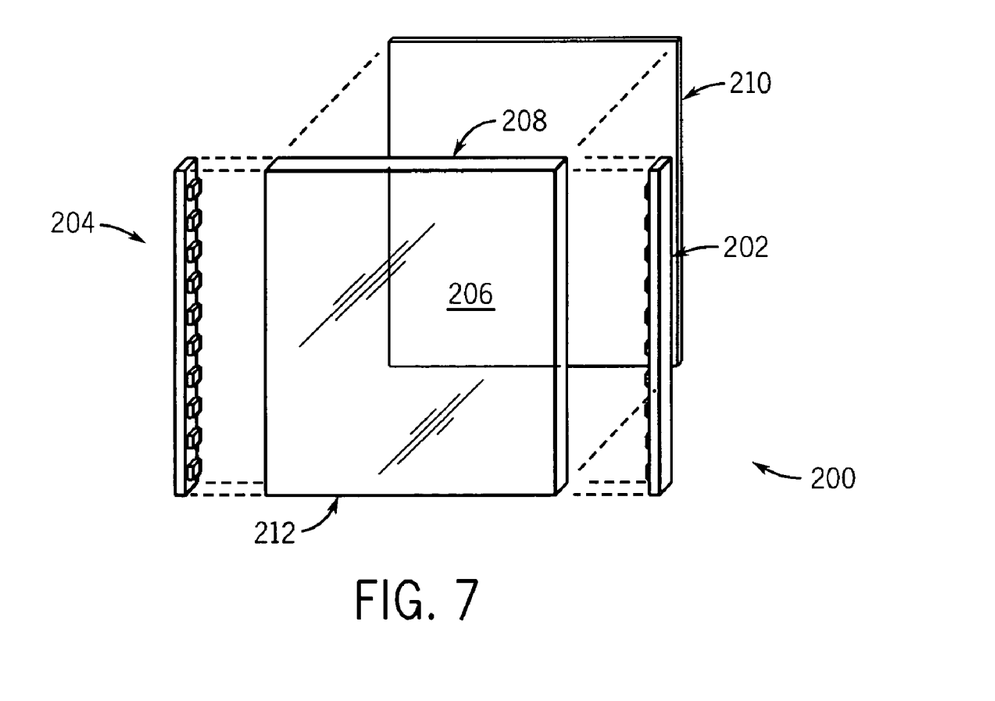
FIG. 7 is a perspective, exploded view of a display system having an edge-lit LED backlight for use with the present invention.

Referring now to FIG. 7, an alternative embodiment of a LCD backlighting system includes an edge-lit backlight system 200. The edge-lit backlight system 200 includes first and second LED assemblies 202, 204 arranged opposite one another and separated by a clear light guide panel 206. Alternatively, the LED assemblies 202, 204 may be arranged on adjacent sides of the edge-lit backlight system 200. Furthermore, the edge-lit backlight system 200 may include only one LED assembly or may even include LED assemblies arranged on all four side of the edge-lit backlight system 200. In any case, engaged with a back 208 of the light guide panel 206 is a reflector film backing 210 configured to reflect light injected by the LED assemblies 202, 204 into the guide panel 206 toward a front 212 of the guide panel 206.

Figure 8:
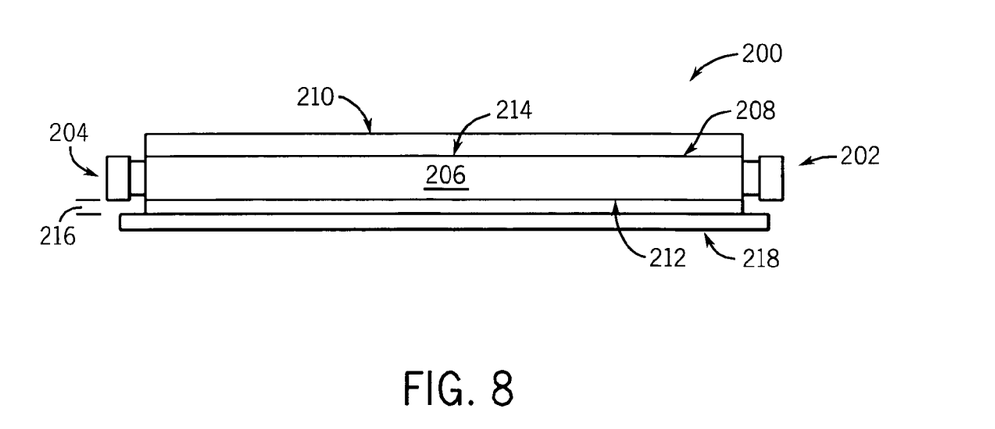
FIG. 8 is a plan, assembled view of the display system of FIG. 7.

This arrangement is further illustrated in FIG. 8, where the reflecting film 210 is arranged against the back 208 of the light guide panel 206. Also arranged at the back 208 of the light guide panel 206 may be a diffusing layer 214 that may be disposed between the reflecting film 210 and the guide panel 206 to diffuse light directed from the light guide panel 206 toward the reflecting film 210 and light directed back from the reflecting film 210 toward the front 212 of the light guide panel 206. Additionally, it is contemplated that one or more brightness enhancing and/or light directing films 216 may be arranged in front of the light guide panel 206. Finally, an LCD panel 218 is arranged forwardly of the edge-lit backlight system 200 to receive light generated by the LED assemblies 202, 204.

Figure 9:
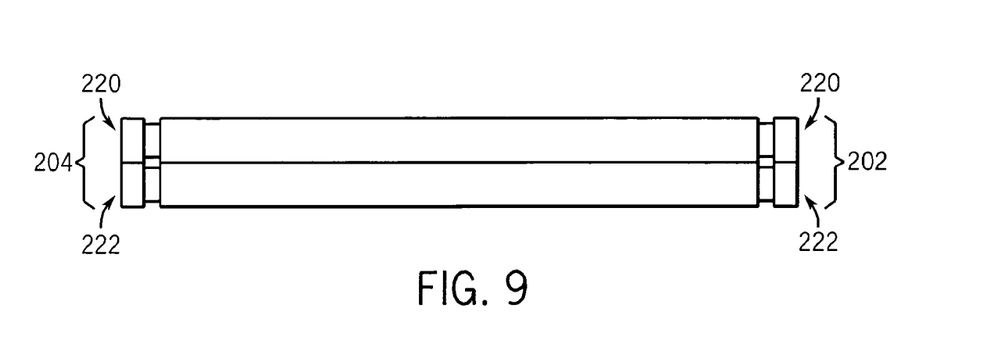
FIG. 9 is a plan, assembled view of a dual-layer edge-lit LED backlight for use with the present invention.

As previously described with respect to FIG. 1, it is contemplated that the multi-LED sets may include red, blue, green and orange LEDs or may include a group having red, blue, and green LEDs with an orange LED positioned proximate to each set of red, blue, and green LEDs. In the case of the latter configuration, referring to FIG. 9, the LED assemblies 202, 204 may be formed of a first array 220 of LEDs formed of the sets or red, blue, and green LEDs and a second array 222 of LEDs formed of the orange LEDs.

Therefore, a system and method of backlighting a display using LEDs is created that does not require filters and meets NVIS standards. In particular, a backlight is created that includes an array of LEDs and a controller configured to selectively illuminate the LEDs in the array. The array of LEDs includes orange LEDs that are illuminated during a night vision viewing mode and may include red LEDs that are illuminated in a non-night vision viewing mode.

The present invention has been described in terms of the preferred embodiment, and it should be appreciated that many equivalents, alternatives, variations, and modifications, aside from those expressly stated, are possible and within the scope of the invention. Therefore, the invention should not be limited to a particular described embodiment.

We claim:

1. A night vision imaging system (NVIS) compatible display comprising:
    an array of light-emitting diodes (LEDs) of different colors configured to backlight the display; including an orange LED, a green LED, and a blue LED; the array including a means for blending the light from the different colors of LED so as to provide the perception of a single color output from the array;
    a controller configured to operate in a first operational mode to jointly illuminate multiple colors of LEDs including the orange LED at a first illumination intensity, the green LED at a second illumination intensity, and the blue LED at a third illumination intensity so as to provide light output from the array having a color perceived substantially as a continuous white spectrum;
    a liquid crystal display (LCD) providing a color display when illuminated by white light, the LCD positioned in front of the array to receive the light in there from; and
    wherein the first, second and third illumination intensities of the array when operated by the controller in the first operational mode do not exceed a maximum level designated for a NVIS standard compliant system and provide for a substantially white spectrum permitting the LCD to produce the color display.

2. The backlighting system of claim 1 further comprising a red LED in the array of LEDs; and
    wherein the controller is configured to operate in the first operational mode to illuminate the orange LED and not the red LED and to operate in a second operational mode to illuminate the red LED the green LED, and a the blue LED so as to provide light output from the array having a color perceived substantially as a continuous white spectrum.

3. The backlighting system of claim 2 further comprising a user control configured to switch between the first operational mode to the second operational mode.

4. The backlighting system of claim 3 wherein the controller provides a substantially continuous control of backlight illumination and wherein the controller is further configured to automatically switch from the second operational mode to the first operational mode at a given intensity as the intensity of the LEDs is continuously varied using the user control.

5. The backlighting system of claim 1 further comprising a far infrared filter arranged over at least one color of LED in the array of LEDs.

6. The backlighting system of claim 1 further comprising at least one filter arranged over at least one color of LED in the array of LEDs to reduce radiation in at least one of lower NVIS band and an upper NVIS band.

7. The backlighting system of claim 1 wherein the means for blending comprises at least one of a diffusing layer and a mixing layer disposed between the array of LEDs and the display and wherein the diffusing layer is configured to diffuse light generated by the array of LEDs and the mixing layer is configured to distribute light generated by the array of LEDs generally evenly.

8. The backlighting system of claim 2 wherein an illumination produced in the second operating mode is designed for viewing the display in daylight, and an illumination produced in the first operating mode is designed for viewing the display in non-daylight.

9. The backlighting system of claim 2 wherein an illumination produced in the first operating mode is Military Standard 3009 compliant.

10. The backlighting system of claim 2 further comprising a filter positioned over at least one of the plurality of LEDs in each set of LEDs configured to reduce an intensity of light produced in at least one of a lower NVIS band and an upper NVIS band.

11. The backlighting system of claim 2 wherein each of the orange LEDs are thin film LEDs.

12. The backlighting system of claim 2 wherein the plurality of LEDs form a cockpit illumination system for a cockpit display.

13. The backlighting system of claim 2 wherein the controller is configured to operate in the second operational mode to illuminate the red LED and not the orange LED.

14. A method of backlighting a liquid crystal display (LCD) for use with NVIS systems comprising:
    activating a plurality of LEDs of different colors including red LEDs, green LEDs, and blue LEDs during a first operating condition that is not compatible with NVIS to provide light perceived as a continuous white spectrum to backlight the LCD providing a color display when illuminated by white light;
    activating a plurality of LEDs of different colors including orange LEDs, green LEDs, and blue LEDs during a second operating condition while deactivating the red LEDs to provide light perceived as a continuous white spectrum to backlight the LCD and viewing the LCD with night vision equipment; and
    wherein an intensity of light emitted during the second operating condition complies with a night vision standard for viewing the LCD with a night vision imaging system (NVIS) while providing for a substantially white spectrum permitting the LCD to provide a color display.

15. The method of claim 14 wherein the night vision viewing standard includes an NVIS, Type II, Class B standard.

16. The method of claim 14 wherein the first operating condition is non-night vision viewing of the display and the second operating condition is a night vision viewing of the display.

17. The method of claim 14 further comprising adjusting an intensity of at least a first colored LED in the plurality of LEDs to provide spectral components of the plurality of LEDs according to a desired ratio.

* * * * *